(12) United States Patent
Kim

(10) Patent No.: US 12,217,373 B2
(45) Date of Patent: Feb. 4, 2025

(54) METHOD, SYSTEM, AND NON-TRANSITORY COMPUTER-READABLE RECORDING MEDIUM FOR MANAGING AUGMENTED REALITY INTERFACE FOR CONTENT PROVIDED BY DIGITAL SIGNAGE

(71) Applicant: KNOWCK CO,. LTD., Seoul (KR)

(72) Inventor: Jeung Ho Kim, Incheon (KR)

(73) Assignee: KNOWCK CO,. LTD., Seoul (KR)

( * ) Notice: Subject to any disclaimer, the term of this patent is extended or adjusted under 35 U.S.C. 154(b) by 0 days.

(21) Appl. No.: 18/018,311

(22) PCT Filed: Jul. 26, 2021

(86) PCT No.: PCT/KR2021/009610
§ 371 (c)(1),
(2) Date: Jan. 27, 2023

(87) PCT Pub. No.: WO2022/025547
PCT Pub. Date: Feb. 3, 2022

(65) Prior Publication Data
US 2024/0037864 A1 Feb. 1, 2024

(30) Foreign Application Priority Data

Jul. 28, 2020 (KR) .................. 10-2020-0094064
Jul. 21, 2021 (KR) .................. 10-2021-0096101

(51) Int. Cl.
*G06T 19/00* (2011.01)
*G06F 9/451* (2018.01)
(Continued)

(52) U.S. Cl.
CPC ............ *G06T 19/006* (2013.01); *G06F 9/451* (2018.02); *G06T 1/0021* (2013.01); *G06V 10/44* (2022.01);
(Continued)

(58) Field of Classification Search
CPC ..... G06T 19/006; G06T 1/0021; G06T 11/00; G06F 9/451; G06V 10/44; G06V 20/20;
(Continued)

(56) References Cited

U.S. PATENT DOCUMENTS

2001/0046307 A1* 11/2001 Wong ................. H04N 1/32283
382/100
2010/0228632 A1* 9/2010 Rodriguez ................ G06T 3/02
705/14.66

(Continued)

FOREIGN PATENT DOCUMENTS

KR 1020130100830 A 9/2013
KR 1020150055302 A 5/2015
(Continued)

*Primary Examiner* — YuJang Tswei
(74) *Attorney, Agent, or Firm* — Dinsmore & Shohl LLP; Yongsok Choi, Esq.

(57) ABSTRACT

A method for managing an augmented reality interface related to a content provided by a digital signage is provided. The method includes the steps of: acquiring a picture photographed by a device in relation to a content provided by a digital signage; and estimating identification information on the content with reference to a comparison target content related to the content and included in a content pool, and causing an augmented reality interface corresponding to the content to be displayed together with the photographed picture, on the basis of the identification information on the content.

15 Claims, 6 Drawing Sheets

(51) Int. Cl.

*G06Q 30/015* (2023.01)
*G06Q 30/0251* (2023.01)
*G06Q 30/0601* (2023.01)
*G06T 1/00* (2006.01)
*G06T 11/00* (2006.01)
*G06V 10/44* (2022.01)
*G06V 20/20* (2022.01)
*G09F 9/30* (2006.01)

(52) U.S. Cl.

CPC ....... *G06Q 30/015* (2023.01); *G06Q 30/0267* (2013.01); *G06Q 30/0268* (2013.01); *G06Q 30/0601* (2013.01); *G06T 11/00* (2013.01); *G06V 20/20* (2022.01); *G09F 9/30* (2013.01)

(58) Field of Classification Search

CPC ............. G06Q 30/015; G06Q 30/0267; G06Q 30/0601; G06Q 30/0268; G09F 9/30

See application file for complete search history.

(56) References Cited

U.S. PATENT DOCUMENTS

| | | | |
|---|---|---|---|
| 2013/0281208 A1* | 10/2013 | Lyons | A63F 13/213 463/33 |
| 2020/0005523 A1* | 1/2020 | Brebner | H04W 4/021 |
| 2020/0320795 A1* | 10/2020 | Dubnov | G06T 19/006 |
| 2021/0044795 A1* | 2/2021 | Karafin | G03H 1/0005 |

FOREIGN PATENT DOCUMENTS

| | | |
|---|---|---|
| KR | 1020170090392 A | 8/2017 |
| KR | 101995914 B1 | 7/2019 |
| KR | 1020190080583 A | 7/2019 |

\* cited by examiner

METHOD, SYSTEM, AND NON-TRANSITORY COMPUTER-READABLE RECORDING MEDIUM FOR MANAGING AUGMENTED REALITY INTERFACE FOR CONTENT PROVIDED BY DIGITAL SIGNAGE

CROSS-REFERENCE TO RELATED APPLICATIONS

This application is a national phase of International Application No. PCT/KR2021/009610 filed on Jul. 26, 2021, which claims priority to Korean Patent Application No. 10-2020-0094064 filed on Jul. 28, 2020 and Korean Patent Application No. 10-2021-0096101 filed on Jul. 21, 2021, the entire contents of which are herein incorporated by reference.

FIELD OF THE INVENTION

The present invention relates to a method, system, and non-transitory computer-readable recording medium for managing an augmented reality interface for a content provided by a digital signage.

BACKGROUND

So-called digital signages or smart signages refer to digital picture devices that are installed in places such as restaurants, offline stores, airports, shopping malls, subways, bus stops, and hotels to provide advertising contents intended by advertisers, and are used for various purposes such as promotion, customer service, and guide.

Although the digital signages are installed and used in various places as described above, one-way digital signages for unilaterally providing information to users account for the majority of them. Two-way digital signages provided with an input means such as a touch screen and configured to interact with users (e.g., self-ordering kiosks at fast food restaurants and ticket vending machines at movie theaters) are limited in use and installation locations.

The reasons why one-way digital signages are mainly used include the facts that they are cheaper than two-way digital signages, developing software for allowing users to interact with the two-way digital signages is burdensome for companies with no or limited developers, and the cost is high because multiple people cannot use one two-way digital signage at the same time, so that multiple two-way digital signages should be installed in one location.

Meanwhile, most two-way digital signages are provided with a touch screen as an input means, which is recommended to be avoided for public health, especially during epidemics.

In this connection, the inventor(s) present a technique for allowing a one-way digital signage to be used in a user-interactive manner like a two-way digital signage, and allowing a two-way digital signage to be used in a contactless manner.

SUMMARY OF THE INVENTION

An object of the present invention is to solve all the above-described problems in the prior art.

An object of the invention is to: acquire a picture photographed by a device in relation to a content provided by a digital signage; and estimate identification information on the content with reference to a comparison target content related to the content and included in a content pool, and cause an augmented reality interface corresponding to the content to be displayed together with the photographed picture, on the basis of the identification information on the content.

An object of the invention is to: acquire a picture photographed by a device in relation to a content provided by a digital signage; specify a comparison target content related to the content on the basis of at least one of information on a position of the device and an identification marker related to the content and included in the acquired picture; and estimate identification information on the content with reference to the specified comparison target content.

An object of the invention is to specify a comparison target content related to a content provided by a digital signage as above, thereby more efficiently estimating identification information on the content provided by the digital signage.

An object of the invention is to allow a one-way digital signage to be used in a user-interactive manner like a two-way digital signage.

An object of the invention is to allow a digital signage to be used in a contactless manner.

An object of the invention is to allow multiple people to use a single digital signage at the same time.

An object of the invention is to allow a one-way digital signage to be used in a user-interactive manner like a two-way digital signage, and allow multiple people to use a single digital signage at the same time, thereby reducing the installation cost of the digital signage.

The representative configurations of the invention to achieve the above objects are described below.

According to one aspect of the invention, there is provided a method comprising the steps of: acquiring a picture photographed by a device in relation to a content provided by a digital signage; and estimating identification information on the content with reference to a comparison target content related to the content and included in a content pool, and causing an augmented reality interface corresponding to the content to be displayed together with the photographed picture, on the basis of the identification information on the content.

According to another aspect of the invention, there is provided a system comprising: a picture acquisition unit configured to acquire a picture photographed by a device in relation to a content provided by a digital signage; and an augmented reality interface management unit configured to estimate identification information on the content with reference to a comparison target content related to the content and included in a content pool, and cause an augmented reality interface corresponding to the content to be displayed together with the photographed picture, on the basis of the identification information on the content.

According to yet another aspect of the invention, there is provided a method comprising the steps of: acquiring a picture photographed by a device in relation to a content provided by a digital signage; specifying a comparison target content related to the content on the basis of at least one of information on a position of the device and an identification marker related to the content and included in the acquired picture; and estimating identification information on the content with reference to the specified comparison target content.

According to still another aspect of the invention, there is provided a system comprising: a picture acquisition unit configured to acquire a picture photographed by a device in relation to a content provided by a digital signage; and an augmented reality interface management unit configured to specify a comparison target content related to the content on the basis of at least one of information on a position of the device and an identification marker related to the content and included in the acquired picture, and estimate identification information on the content with reference to the specified comparison target content.

In addition, there are further provided other methods and systems to implement the invention, as well as non-transitory computer-readable recording media having stored thereon computer programs for executing the methods.

According to the invention, it is possible to: acquire a picture photographed by a device in relation to a content provided by a digital signage; and estimate identification information on the content with reference to a comparison target content related to the content and included in a content pool, and cause an augmented reality interface corresponding to the content to be displayed together with the photographed picture, on the basis of the identification information on the content.

According to the invention, it is possible to: acquire a picture photographed by a device in relation to a content provided by a digital signage; specify a comparison target content related to the content on the basis of at least one of information on a position of the device and an identification marker related to the content and included in the acquired picture; and estimate identification information on the content with reference to the specified comparison target content.

According to the invention, it is possible to specify a comparison target content related to a content provided by a digital signage as above, thereby more efficiently estimating identification information on the content provided by the digital signage.

According to the invention, it is possible to allow a one-way digital signage to be used in a user-interactive manner like a two-way digital signage.

According to the invention, it is possible to allow a digital signage to be used in a contactless manner.

According to the invention, it is possible to allow multiple people to use a single digital signage at the same time.

According to the invention, it is possible to allow a one-way digital signage to be used in a user-interactive manner like a two-way digital signage, and allow multiple people to use a single digital signage at the same time, thereby reducing the installation cost of the digital signage.

DETAILED DESCRIPTION OF THE INVENTION

Figure 1:
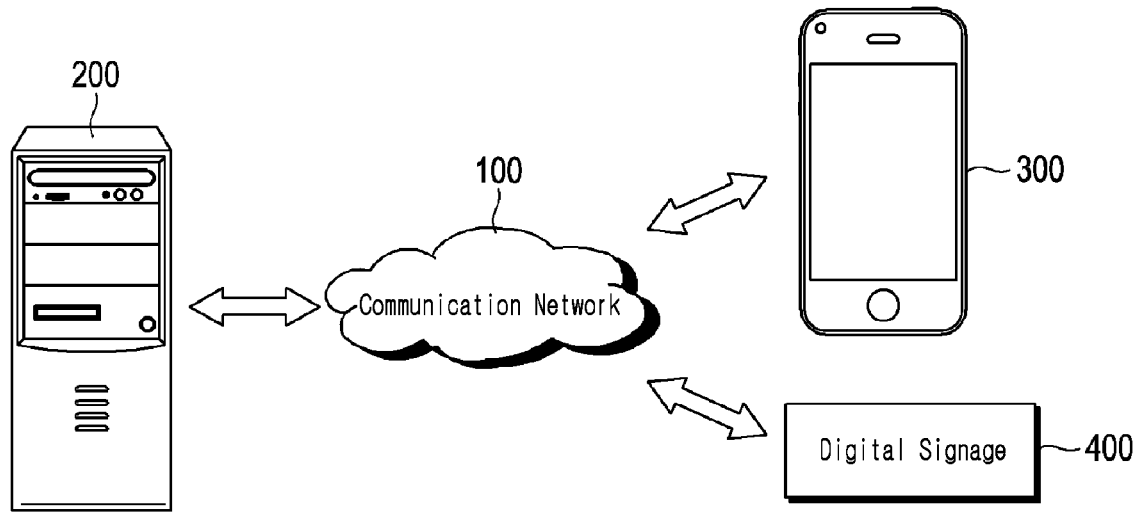
FIG. 1 schematically shows the configuration of an entire system for managing an augmented reality interface related to a content provided by a digital signage according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Configuration of the Entire System

FIG. 1 schematically shows the configuration of the entire system for managing an augmented reality interface related to a content provided by a digital signage according to one embodiment of the invention.

As shown in FIG. 1, the entire system according to one embodiment of the invention may comprise a communication network 100, a service provision system 200, a device 300, and a digital signage 400.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the service provision system 200 according to one embodiment of the invention may function to: acquire a picture photographed by a device in relation to a content provided by a digital signage; and estimate identification information on the content with reference to a comparison target content related to the content and included in a content pool, and cause an augmented reality interface corresponding to the content to be displayed together with the photographed picture, on the basis of the identification information on the content.

Further, the service provision system 200 according to one embodiment of the invention may function to: acquire a picture photographed by a device in relation to a content provided by a digital signage; specify a comparison target content related to the content on the basis of at least one of information on a position of the device and an identification marker related to the content and included in the acquired picture; and estimate identification information on the content with reference to the specified comparison target content.

The configuration and functions of the service provision system 200 according to the invention will be discussed in more detail below.

Next, the device 300 according to one embodiment of the invention is digital equipment capable of connecting to and then communicating with the service provision system 200, and any type of digital equipment having a memory means and a microprocessor for computing capabilities, such as smart phones, tablets, smart watches, smart bands, smart glasses, desktop computers, notebook computers, workstations, personal digital assistants (PDAs), web pads, and mobile phones, may be adopted as the device 300 according to the invention.

In particular, the device 300 may include an application (not shown) for assisting a user to receive a service according to the invention from the service provision system 200. The application may be downloaded from the service provision system 200 or an external application distribution server (not shown). Meanwhile, the characteristics of the application may be generally similar to those of a picture acquisition unit 210, an augmented reality interface management unit 220, a performance information management unit 230, a communication unit 240, and a control unit 250 of the service provision system 200 to be described below. Here, at least a part of the application may be replaced with a hardware device or a firmware device that may perform a substantially equal or equivalent function, as necessary.

Next, according to one embodiment of the invention, the digital signage 400 may comprise a set-top box (not shown), which is a component that functions to communicate with the service provision system 200 or a content management server (not shown) and control contents to be provided to people. Further, according to one embodiment of the invention, the digital signage 400 may further comprise a display means such as an LCD panel or an OLED panel, speakers for sound output, and the like.

According to one embodiment of the invention, the digital signage 400 may be installed in a public place such as a restaurant, an offline store, an airport, a shopping mall, a subway, a bus stop, and a hotel. However, it should be noted that these places are merely illustrative and the place where the digital signage 400 according to the invention is installed is not necessarily limited to those listed above.

Configuration of the Service Provision System

Hereinafter, the internal configuration of the service provision system 200 200 crucial for implementing the invention and the functions of the respective components thereof will be discussed.

Figure 2:
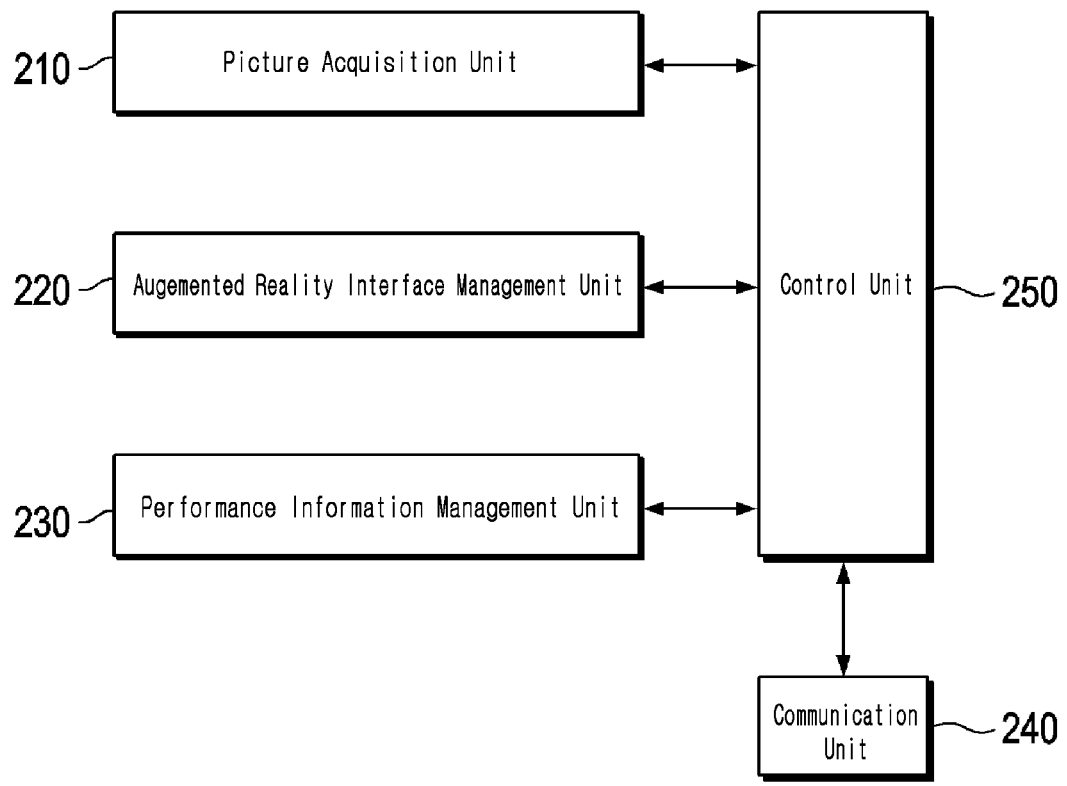
FIG. 2 specifically shows the internal configuration of a service provision system according to one embodiment of the invention.

FIG. 2 specifically shows the internal configuration of the service provision system 200 according to one embodiment of the invention.

As shown in FIG. 2, the service provision system 200 according to one embodiment of the invention may comprise a picture acquisition unit 210, an augmented reality interface management unit 220, a performance information management unit 230, a communication unit 240, and a control unit 250. According to one embodiment of the invention, at least some of the picture acquisition unit 210, the augmented reality interface management unit 220, the performance information management unit 230, the communication unit 240, and the control unit 250 may be program modules to communicate with an external system (not shown). The program modules may be included in the service provision system 200 in the form of operating systems, application program modules, and other program modules, while they may be physically stored in a variety of commonly known storage devices. Further, the program modules may also be stored in a remote storage device that may communicate with the service provision system 200. Meanwhile, such program modules may include, but are not limited to, routines, subroutines, programs, objects, components, data structures, and the like for performing specific tasks or executing specific abstract data types as will be described below in accordance with the invention.

Meanwhile, according to one embodiment of the invention, the service provision system 200 may function to provide source data of contents provided by the digital signage 400. However, a content management server (not shown) may function as a component for providing the source data of the contents separately from the service provision system 200.

Meanwhile, the above description is illustrative although the service provision system 200 has been described as above, and it will be apparent to those skilled in the art that at least a part of the components or functions of the service provision system 200 may be implemented or included in the device 300, the digital signage 400, or the content management server (not shown), as necessary.

First, the picture acquisition unit 210 according to one embodiment of the invention may function to acquire a picture photographed by the device 300 in relation to a content provided by the digital signage 400.

Specifically, a user may use the device 300 to photograph at least a part of the content provided by the digital signage 400, and the picture acquisition unit 210 according to one embodiment of the invention may acquire the photographed picture. Here, it should be understood that the picture photographed by the device 300 does not necessarily include all of the content, and it is sufficient if the content is included only to the extent that identification information on the content may be estimated. Meanwhile, estimating the identification information on the content will be described below.

Further, according to one embodiment of the invention, the content provided by the digital signage 400 may be changed according to changes in time, place, or surrounding circumstances, and may also be dynamically changed according to user operations on an augmented reality interface.

More specifically, the picture acquired as above by the picture acquisition unit 210 according to one embodiment of the invention may include an identification marker related to the content provided by the digital signage 400. According to one embodiment of the invention, the identification marker related to the content provided by the digital signage 400 may refer to an identifier assigned to the content in order to identify the content. According to one embodiment of the invention, the identification marker related to the content may refer to an identifier for exactly specifying what the content is, but may also refer to an identifier for reducing the number of comparison target contents related to the content, which are to be compared with the acquired picture in order to identify the content. That is, as will be described below, the augmented reality interface management unit 220 according to one embodiment of the invention may specify the comparison target contents related to the content, which are to be compared with the acquired picture, on the basis of the identification marker related to the content, so that the number of comparison target contents to be compared may be reduced in comparison with the case where such specifying is not carried out.

In addition, according to one embodiment of the invention, the identification marker related to the content may be represented in the form of a graphical element or the like and included in a part of the content (e.g., a video). However, a visually indistinguishable watermark may be included in the content as the identification marker related to the content, in order to prevent it from affecting the content (e.g., obscuring a part of the content).

Further, according to one embodiment of the invention, in order for the identification marker related to the content to minimally affect the content, the identification marker related to the content may be included in the picture acquired by the picture acquisition unit 210 according to one embodiment of the invention at a predetermined interval of frames. For example, a frame including the identification marker may appear in the picture acquired by the picture acquisition unit 210 according to one embodiment of the invention once every 10 frames.

Meanwhile, the picture acquisition unit 210 according to one embodiment of the invention may acquire the picture photographed by the device 300 in relation to the content provided by the digital signage 400 at a predetermined interval of frames. That is, the picture acquisition unit 210 according to one embodiment of the invention may acquire the photographed picture at a predetermined interval of frames, and as will be described below, the augmented reality interface management unit 220 according to one embodiment of the invention may estimate identification information on the content on the basis of the acquired picture and/or the identification marker related to the content and included in the picture, thereby reducing the computing resources required for the estimation.

However, the form of the identification marker included in the picture acquired by the picture acquisition unit 210 according to one embodiment of the invention, or the manner of acquiring the picture (or the identification marker related to the content and included in the picture), is not limited to the above description, and may be diversely changed as long as the objects of the invention may be achieved.

Figure 3A:
FIGS. 3A and 3B illustratively show how to display an augmented reality interface according to one embodiment of the invention.

FIG. 3A illustratively shows how to display an augmented reality interface according to one embodiment of the invention.

For example, referring to FIG. 3A, the digital signage 400 may provide a specific content 410 via a display, and the content 410 may be photographed by the device 300. Further, the picture acquisition unit 210 according to one embodiment of the invention may acquire a picture 310 photographed by the device 300.

Meanwhile, the picture acquisition unit 210 according to one embodiment of the invention may function to pre-process the acquired picture. Further, according to one embodiment of the invention, the pre-processing may include at least one of picture simplification and feature detection.

Specifically, according to one embodiment of the invention, the pre-processing may refer to compressing and converting the acquired picture in order to estimate identification information on the content provided by the digital signage 400.

For example, the picture acquisition unit 210 according to one embodiment of the invention may perform the pre-processing to simplify the acquired picture by adjusting the resolution, size, color information, and the like of the acquired picture.

Continuing with the example, the picture acquisition unit 210 according to one embodiment of the invention may perform the pre-processing to detect features from the acquired picture. The feature detection may be performed after simplifying the acquired picture, and may be carried out using various feature detection algorithms such as canny edge detection, Harris corner detection, scale-invariant feature transform (SIFT), speeded-up robust features (SURF), and oriented FAST and rotated BRIEF (ORB).

However, the type of pre-processing that may be performed by the picture acquisition unit 210 according to one embodiment of the invention and the method of performing the pre-processing are not limited to those listed above, and may be diversely changed as long as the objects of the invention may be achieved. Further, the pre-processing is not necessarily performed by the picture acquisition unit 210 according to one embodiment of the invention, and the picture acquisition unit 210 according to one embodiment of the invention may transmit the acquired picture to the content management server (not shown) so that the acquired picture is pre-processed by the content management server (not shown).

Next, when the picture photographed by the device 300 in relation to the content provided by the digital signage 400 is acquired, the augmented reality interface management unit 220 according to one embodiment of the invention may function to estimate identification information on the content with reference to a comparison target content related to the content and included in a content pool.

Specifically, the augmented reality interface management unit 220 according to one embodiment of the invention may estimate the identification information on the content provided by the digital signage 400 by comparing the acquired picture with comparison target contents related to the content. Here, according to one embodiment of the invention, the identification information on the content may refer to information by which the content may be identified. For example, the identification information on the content may refer to, but is not limited to, a file name of the content, a title of the content, and metadata of the content.

For example, according to one embodiment of the invention, the comparison may be carried out using various algorithms such as histogram comparison, template matching, feature matching, and keypoint matching based on ANN (Approximate Nearest Neighbor), and may also be performed using machine learning-based object detection algorithms. Further, as a result of the comparison, a comparison target content determined to be most similar to the acquired picture is derived from among the comparison target contents, and the identification information on the content provided by the digital signage 400 may be estimated with reference to the derived comparison target content.

According to one embodiment of the invention, the comparison target content may be the content as is provided by the digital signage 400 (i.e., the original content), but may also be a content obtained by pre-processing the original content. Thus, the augmented reality interface management unit 220 according to one embodiment of the invention may estimate the identification information on the content provided by the digital signage 400 by comparing the pre-processed original content (i.e., the comparison target content) with a picture obtained by pre-processing the picture acquired by the picture acquisition unit 210 according to one embodiment of the invention. Meanwhile, the pre-processing of the original content may refer to compressing and converting the original content, and may be carried out in the same manner as the pre-processing of the picture acquired by the picture acquisition unit 210 according to one embodiment of the invention as described above. Therefore, a detailed description thereof will be omitted.

Meanwhile, according to one embodiment of the invention, the content pool may include the comparison target content, and may further include the original content (i.e., the content not pre-processed) if the comparison target content is the pre-processed original content. Further, according to one embodiment of the invention, the content pool may be a component of the service provision system 200, but may also be included in the content management server (not shown) that is a component separate from the service provision system 200.

Meanwhile, the augmented reality interface management unit 220 according to one embodiment of the invention may specify a comparison target content related to the content on the basis of at least one of information on a position of the device 300 photographing the content provided by the digital signage 400 and an identification marker related to the content and included in the picture acquired by the picture acquisition unit 210 according to one embodiment of the invention, and estimate identification information on the content with reference to the specified comparison target content.

Specifically, the augmented reality interface management unit 220 according to one embodiment of the invention may specify at least one content to be compared with the acquired picture from among contents included in the content pool as the comparison target content related to the content, on the basis of at least one of the information on the position of the device 300 and the identification marker related to the content.

For example, the augmented reality interface management unit 220 according to one embodiment of the invention may identify at least one digital signage 400 located within a predetermined distance from the position of the device 300 on the basis of the information on the position of the device 300, and specify a content corresponding to a picture being provided by the at least one digital signage 400 and/or a picture scheduled for the at least one digital signage 400 from among the contents included in the content pool as the comparison target content to be compared with the acquired picture.

As another example, the augmented reality interface management unit 220 according to one embodiment of the invention may identify at least one content associated with the identification marker related to the content from among the contents included in the content pool, on the basis of the identification marker related to the content, and specify the at least one content as the comparison target content to be compared with the acquired picture.

Further, the augmented reality interface management unit 220 according to one embodiment of the invention may specify the comparison target content related to the content with reference to associated identification information, which is estimated in relation to an associated content that is provided by the digital signage 400 temporally adjacent to the content provided by the digital signage 400 (i.e., the content photographed by the device 300).

For example, the augmented reality interface management unit 220 according to one embodiment of the invention may estimate associated identification information on an associated content that is provided by the digital signage 400 temporally prior to the content provided by the digital signage 400, on the basis of an identification marker related to the associated content and included in the associated content. According to one embodiment of the invention, the associated identification information may refer to identification information on another content that is provided by the digital signage 400 temporally adjacent to the associated content. Further, the augmented reality interface management unit 220 according to one embodiment of the invention may specify the comparison target content related to the content provided by the digital signage 400 with reference to the associated identification information estimated as above, thereby reducing the number of contents to be compared with the picture photographed by the device 300 in relation to the content.

Meanwhile, the augmented reality interface management unit 220 according to one embodiment of the invention may function to cause an augmented reality interface corresponding to the content to be displayed together with the picture photographed by the device 300, on the basis of the identification information on the content estimated by the augmented reality interface management unit 220.

Specifically, when the content provided by the digital signage 400 is identified, the augmented reality interface management unit 220 according to one embodiment of the invention may determine an augmented reality interface corresponding to the content on the basis of the identification information. Further, the augmented reality interface management unit 220 according to one embodiment of the invention may cause the determined augmented reality interface to be displayed together with the picture photographed by the device 300.

Meanwhile, according to one embodiment of the invention, the augmented reality interface may correspond to the content provided by the digital signage 400 according to a category of the content, and a default augmented reality interface may be provided according to the category of the content so that a service provider related to the digital signage 400 may use the service provision system 200 without having to personally implement an augmented reality interface. Further, according to one embodiment of the invention, the category of the content may be classified on the basis of metadata (e.g., tags) of the content or metadata of the comparison target content related to the content.

For example, if the content provided by the digital signage 400 is a content related to restaurant business (i.e., the category of the content is classified as restaurant business), the augmented reality interface corresponding to the content may be a default augmented reality interface that basically provides functions related to ordering food (e.g., searching, ordering, and paying).

Further, the augmented reality interface management unit 220 according to one embodiment of the invention may allow functions associated with the augmented reality interface to be carried out on the basis of user operations on the augmented reality interface. Further, according to one embodiment of the invention, the augmented reality interface and at least a part of the functions associated therewith may be implemented on the basis of an application programming interface (API).

Specifically, according to one embodiment of the invention, the functions associated with the augmented reality interface may include ordering, booking, searching, paying, purchasing, providing information, supporting communication, and the like. However, the functions associated with the augmented reality interface are not limited to those listed above, and may be diversely changed as long as the objects of the invention may be achieved. Further, the functions may be carried out on the basis of user operations on the augmented reality interface, such as touching certain graphical elements included in the augmented reality interface or inputting voice commands, and at least a part of the augmented reality interface may be dynamically changed according to the user operations. Further, at least a part of the content provided by the digital signage 400 may be dynamically changed according to the user operations.

Further, the augmented reality interface management unit 220 according to one embodiment of the invention may allow the above functions to be carried out by causing at least one of the device 300, the digital signage 400, and a peripheral of the digital signage 400 (e.g., a payment module or a printer) to be controlled by the service provision system 200 or the content management server (not shown).

Furthermore, according to one embodiment of the invention, an application programming interface for allowing a service provider related to the digital signage 400 to provide an augmented reality interface and functions associated therewith to users while maintaining the existing system may be distributed to a terminal device (not shown) of the service provider. In addition, the augmented reality interface management unit 220 according to one embodiment of the invention may function to allow the service provider to implement the augmented reality interface and the functions associated therewith using the distributed application programming interface, and cause them to interwork with the existing system. For example, when the service provider creates an ordering function in the augmented reality interface, the augmented reality interface management unit 220 according to one embodiment of the invention may create an application programming interface for the ordering function so that the service provider may cause the existing system to interwork with the ordering function.

FIGS. 3B to 6 illustratively show how to display an augmented reality interface according to one embodiment of the invention.

Figure 3B:
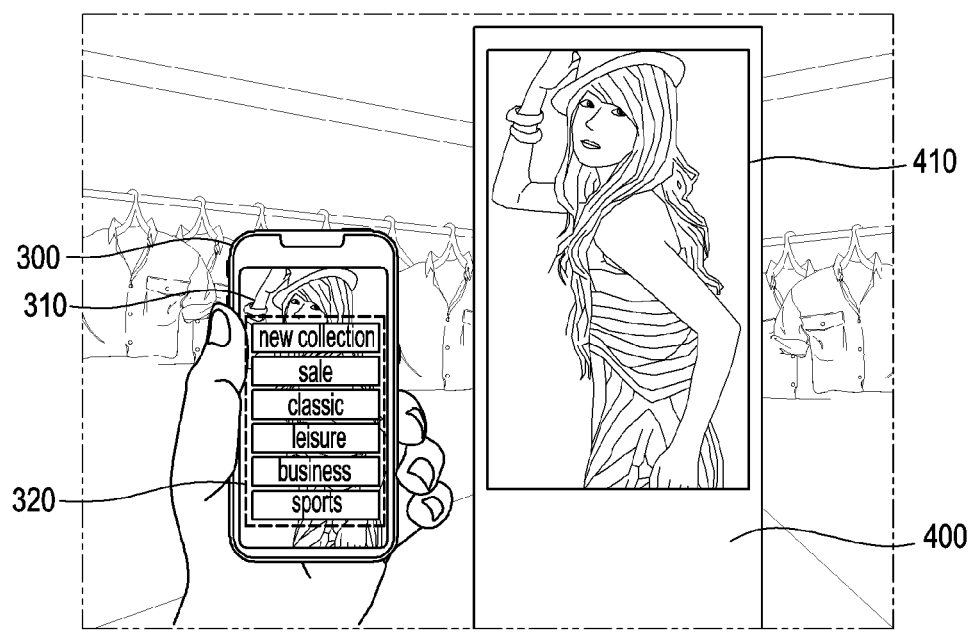

For example, referring to FIG. 3B, when identification information on a content 410 provided by the digital signage 400 is estimated, the augmented reality interface management unit 220 according to one embodiment of the invention may function to cause an augmented reality interface 320 corresponding to the content 410 to be displayed together with a picture 310 photographed by the device 300 on the basis of the estimated identification information. Continuing with the example, when a user touches a specific graphical element (e.g., "new collection") included in the augmented reality interface 320, a function associated with the graphical element (e.g., displaying information on brand-new apparel together with the photographed picture 310) may be carried out.

Figure 4:
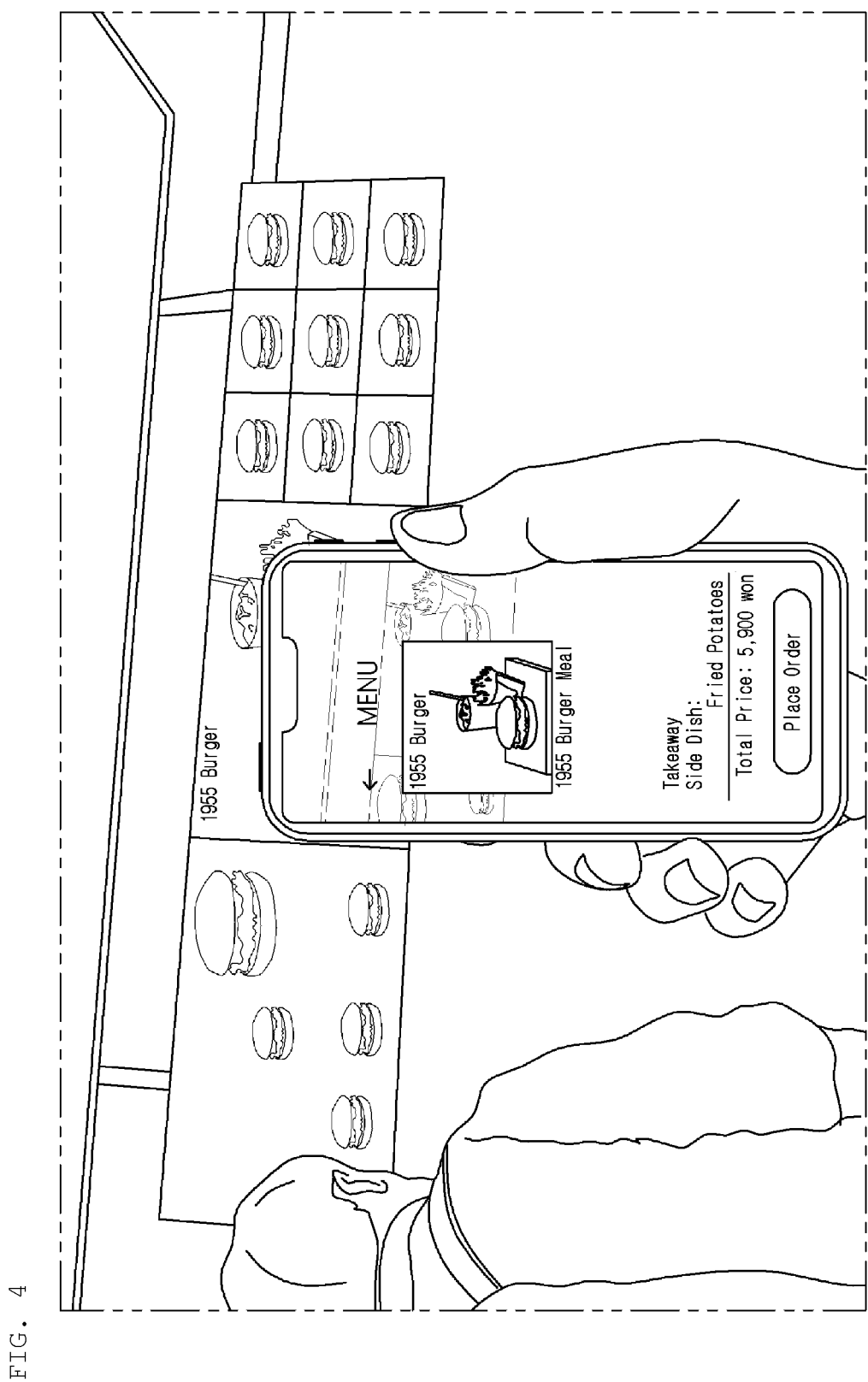
FIG. 4 illustratively shows how to display an augmented reality interface according to one embodiment of the invention.

As another example, referring to FIG. 4, when identification information on contents (e.g., various menus provided by a menu board) provided by a digital signage (e.g., a menu board) is estimated, the augmented reality interface management unit 220 according to one embodiment of the invention may function to cause an augmented reality interface corresponding to the contents to be displayed together with a picture photographed by a device on the basis of the estimated identification information. Continuing with the example, when a user touches a specific graphical element (e.g., "Place Order") included in the augmented reality interface, a function associated with the graphical element may be carried out (e.g., a payment module for ordering a selected menu may be executed and interworked).

Figure 5:
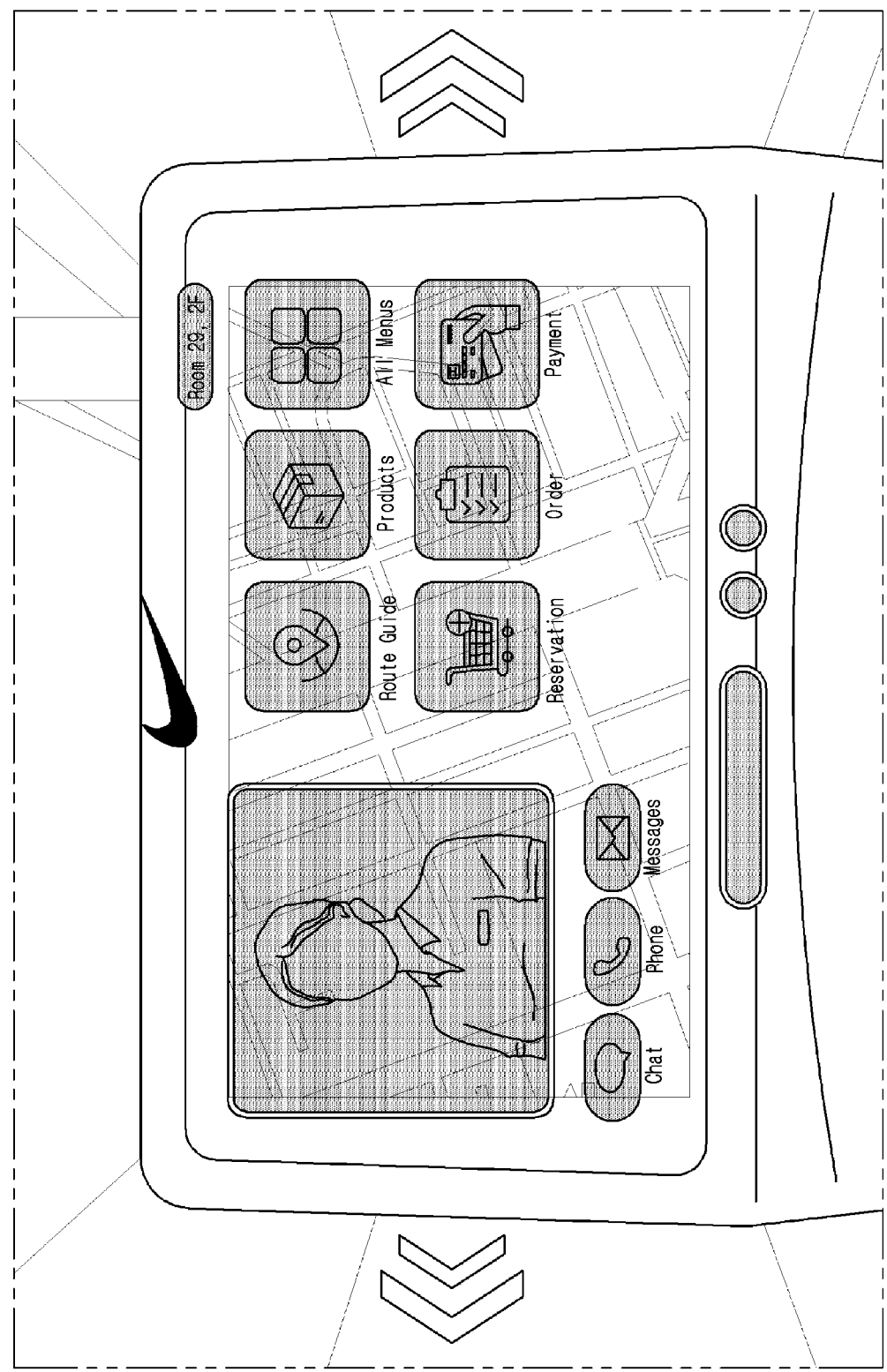
FIG. 5 illustratively shows how to display an augmented reality interface according to one embodiment of the invention.

As another example, referring to FIG. 5, when identification information on a content (e.g., a map of a shopping mall) provided by a digital signage (e.g., a guide kiosk installed in the shopping mall) is estimated, the augmented reality interface management unit 220 according to one embodiment of the invention may function to cause an augmented reality interface corresponding to the content (e.g., information on stores in the shopping mall) to be displayed together with a picture photographed by a device (e.g., smart glasses) on the basis of the estimated identification information. Continuing with the example, when a user touches a specific graphical element included in the augmented reality interface or inputs a voice command (e.g., "Search for a Nike store."), a function associated with the graphical element (e.g., displaying an interface that provides information on the Nike store together with the picture photographed by the device, or displaying the location of the Nike store on the map provided by the digital signage) may be carried out. Continuing with the example, when the user selects a route guide in the augmented reality interface, a corresponding function may be provided as another augmented reality interface.

Figure 6A:
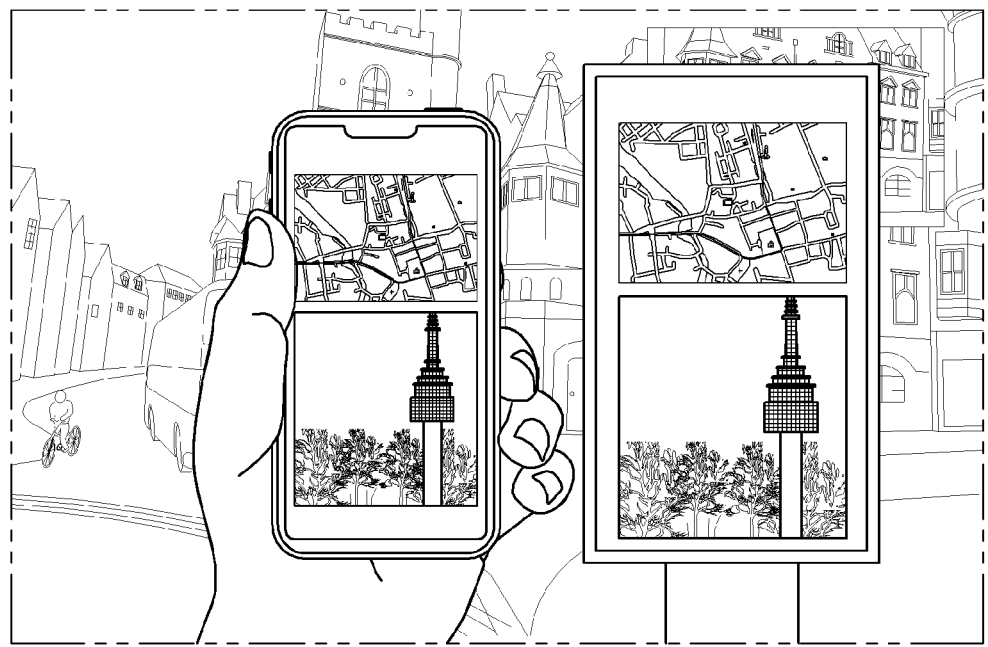
FIGS. 6A and 6B illustratively show how to display an augmented reality interface according to one embodiment of the invention.
Figure 6B:
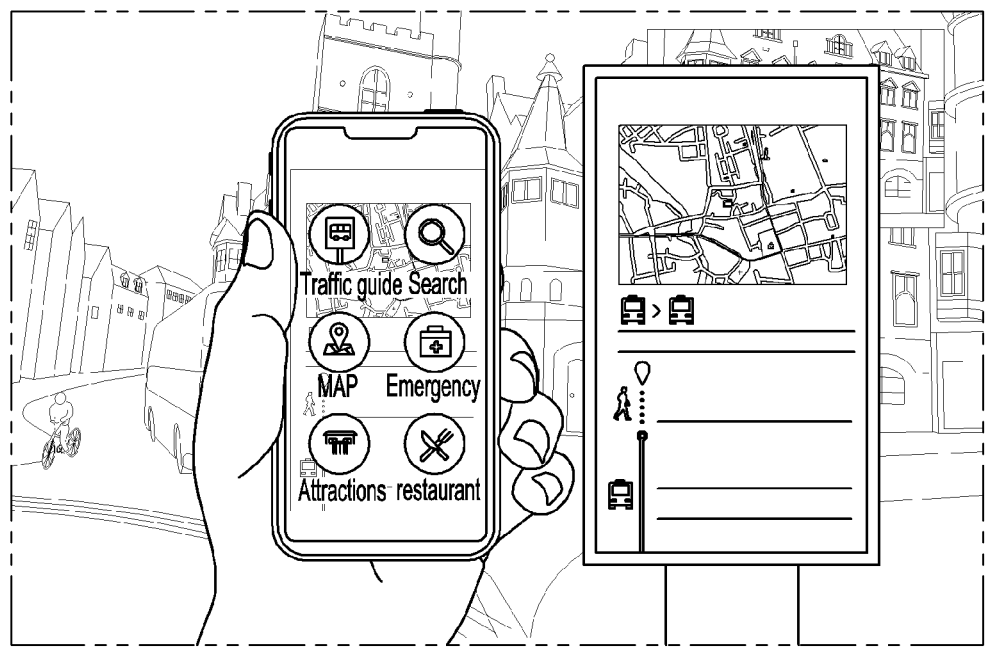

As another example, referring to FIGS. 6A and 6B, when identification information on a content (e.g., tourist information on Nanshan Tower) provided by a digital signage (e.g., a tourist guide display) is estimated, the augmented reality interface management unit 220 according to one embodiment of the invention may function to cause an augmented reality interface corresponding to the content (e.g., a traffic guide, a map, or nearby restaurants) to be displayed together with a picture photographed by a device on the basis of the estimated identification information. Continuing with the example, when a user touches a specific graphical element (e.g., a traffic guide) included in the augmented reality interface, a function associated with the graphical element (e.g., displaying information on transportation to Namsan Tower together with the picture photographed by the device, or changing the content provided by the digital signage to the information on transportation to Namsan Tower) may be carried out.

Figure 7:
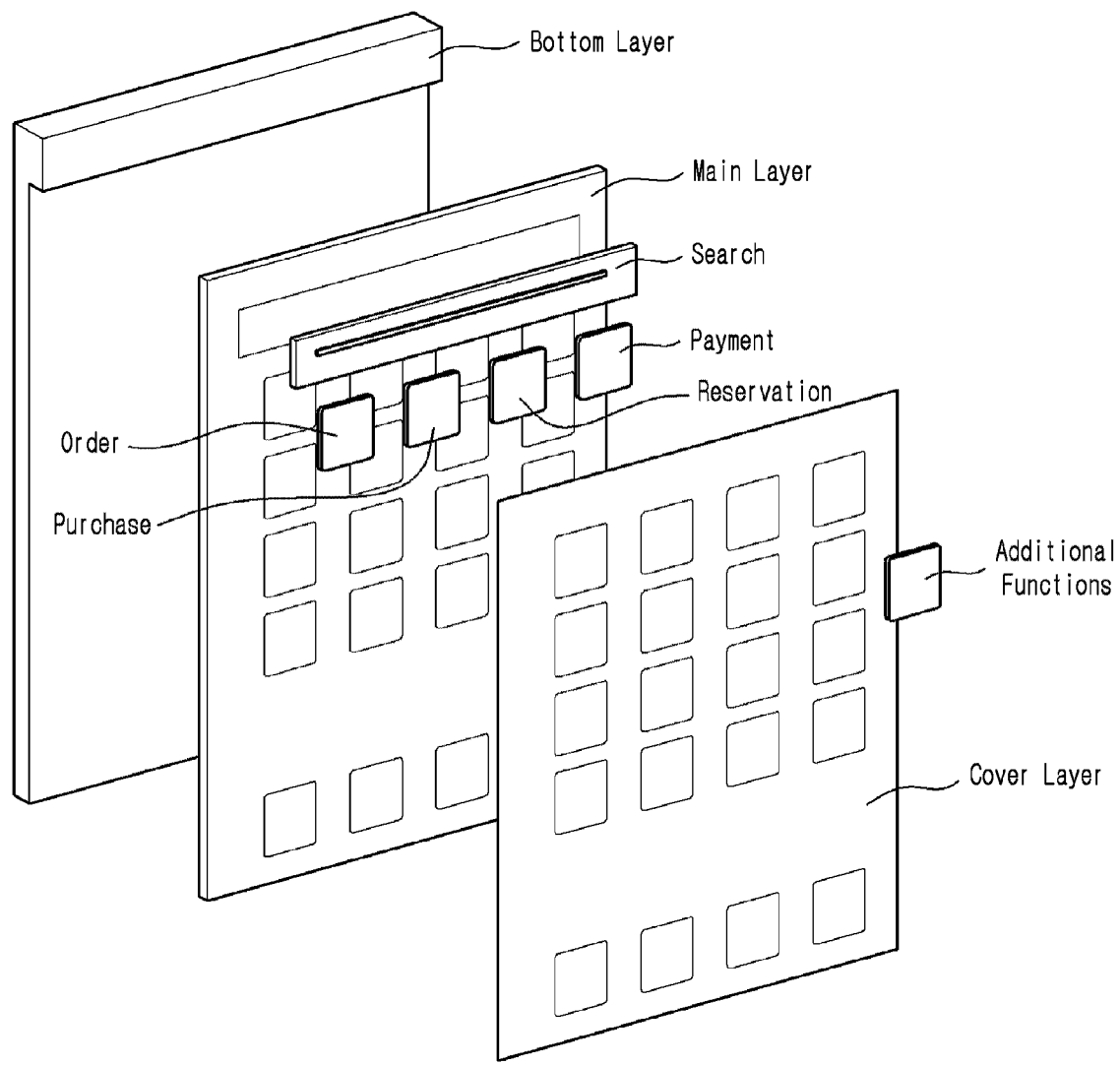
FIG. 7 illustratively shows how to implement an augmented reality interface according to one embodiment of the invention.

FIG. 7 illustratively shows how to implement an augmented reality interface according to one embodiment of the invention.

For example, referring to FIG. 7, the augmented reality interface according to one embodiment of the invention may be implemented in multiple layers, and the augmented reality interface management unit 220 according to one embodiment of the invention may allow the augmented reality interface and functions associated therewith (e.g., search, order, purchase, reservation, payment, and other additional functions) to be implemented on the basis of an application programming interface.

Meanwhile, the augmented reality interface management unit 220 according to one embodiment of the invention may cause an augmented reality interface customized for each user to be displayed on the basis of the user's personal information acquired from the device 300. The user's personal information may include, but is not limited to, identification information on the user or the device 300, and settings that are preset by the user in relation to the augmented reality interface.

Meanwhile, the augmented reality interface management unit 220 according to one embodiment of the invention may estimate identification information on the digital signage 400 on the basis of at least one of information on a position of the device 300 photographing the content provided by the digital signage 400, an identification marker related to the content, and identification information on the content. Further, when the identification information on the digital signage 400 is estimated as above, the augmented reality interface management unit 220 according to one embodiment of the invention may cause an augmented reality interface corresponding to the content to be displayed together with a picture photographed by the device 300, with reference to information on a surrounding space of the digital signage 400.

Specifically, when the digital signage 400 is specifically identified (i.e., when the identification information on the digital signage 400 is estimated), the augmented reality interface management unit 220 according to one embodiment of the invention may acquire information on buildings, facilities, environments, and the like surrounding the digital signage 400 as the information on the surrounding space of the digital signage 400. According to one embodiment of the invention, the information on the surrounding space of the digital signage 400 may be acquired from the digital signage 400 in which the information is pre-stored. Further, when the picture photographed by the device 300 includes the above buildings, facilities, environments, and the like, the augmented reality interface management unit 220 according to one embodiment of the invention may cause the augmented reality interface corresponding to the content to be appropriately displayed in a position associated with the photographed buildings, facilities, environments, and the like, with reference to the acquired information on the surrounding space of the digital signage 400.

By acquiring and using the information on the surrounding space of the digital signage 400 as above, the augmented reality interface management unit 220 according to one embodiment of the invention may allow the augmented reality interface to be displayed more efficiently than when the device 300 or the augmented reality interface management unit 220 directly analyzes the picture photographed by the device 300 to estimate the information on the surrounding space.

Next, when the identification information on the digital signage 400 is estimated with reference to the picture photographed by the device 300 in relation to the content provided by the digital signage 400, the performance information management unit 230 according to one embodiment of the invention may function to derive at least one of performance information on the content and performance information on the digital signage 400 on the basis of the identification information on the content and the identification information on the digital signage 400.

Specifically, according to one embodiment of the invention, the picture photographed by the device 300 in relation to the content provided by the digital signage 400 may include an identification marker related to the digital signage 400 and intended to identify the digital signage 400. More specifically, the identification marker related to the digital signage 400 may refer to an identifier assigned to the digital signage 400 in order to identify the digital signage 400, and may be represented in the form of an ID, a graphical element, or the like. Further, the identification marker related to the digital signage 400 may be included in the content provided by the digital signage 400, or may be disposed on or around the body of the digital signage 400. However, the form and position of the identification marker related to the digital signage 400 and intended to identify the digital signage 400 are not limited to those listed above, and may be diversely changed as long as the objects of the invention may be achieved.

In addition, the performance information management unit 230 according to one embodiment of the invention may estimate the identification information on the digital signage 400 with reference to the identification marker related to the digital signage 400 and included in the picture photographed by the device 300 in relation to the content provided by the digital signage 400. Further, the performance information management unit 230 according to one embodiment of the invention may derive at least one of information on how many users utilize the digital signage 400 (i.e., performance information on the digital signage) and information on how many users are viewing or have viewed (or are photographing or have photographed) the content provided by the digital signage 400 (i.e., performance information on the content provided by the digital signage), on the basis of the identification information on the content provided by the digital signage 400 and the identification information on the digital signage 400. Furthermore, the performance information management unit 230 according to one embodiment of the invention may derive at least one of the performance information on the content and the performance information on the digital signage 400 in more detail, on the further basis of personal information of the users acquired from the device 300.

Next, the communication unit 240 according to one embodiment of the invention may function to enable data transmission/reception from/to the picture acquisition unit 210, the augmented reality interface management unit 220, and the performance information management unit 230.

Lastly, the control unit 250 according to one embodiment of the invention may function to control data flow among the picture acquisition unit 210, the augmented reality interface management unit 220, the performance information management unit 230, and the communication unit 240. That is, the control unit 250 according to the invention may control data flow into/out of the service provision system 200 or data flow among the respective components of the service provision system 200, such that the picture acquisition unit 210, the augmented reality interface management unit 220, the performance information management unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM), and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for managing an augmented reality interface related to a content provided by a digital signage, the method comprising the steps of:
    acquiring a picture photographed by a device in relation to a content provided by a digital signage;
    estimating identification information on the content with reference to a comparison target content related to the content and included in a content pool, and causing an augmented reality interface corresponding to the content to be displayed together with the photographed picture, on the basis of the identification information on the content; and
    in response to identification information on the digital signage being estimated with reference to the photographed picture, deriving performance information on the content and performance information on the digital signage on the basis of the identification information on the content and the identification information on the digital signage,
    wherein the identification information on the digital signage is estimated with reference to an identification marker included in the photographed picture, and
    wherein the performance information on the content is derived on the basis of a number of users who view or photograph the content, and the performance information on the digital signage is derived on the basis of a number of users who utilize the digital signage.

2. The method of claim 1, further comprising the step of:
    allowing a function associated with the augmented reality interface to be carried out on the basis of a user operation on the augmented reality interface.

3. The method of claim 2, wherein at least one of at least a part of the augmented reality interface and at least a part of the content is dynamically changed on the basis of the user operation.

4. The method of claim 1, wherein the augmented reality interface and at least a part of functions associated the augmented reality interface are implemented on the basis of an application programming interface (API).

5. The method of claim 1, wherein the acquiring step comprises the step of pre-processing the acquired picture,
    wherein the comparison target content is acquired by pre-processing the content, and
    wherein the pre-processing includes at least one of picture simplification and feature detection.

6. A non-transitory computer-readable recording medium having stored thereon a computer program for executing the method of claim 1.

7. A system for managing an augmented reality interface related to a content provided by a digital signage, the system comprising:
    a picture acquisition unit configured to acquire a picture photographed by a device in relation to a content provided by a digital signage;
    an augmented reality interface management unit configured to estimate identification information on the content with reference to a comparison target content related to the content and included in a content pool, and cause an augmented reality interface corresponding to the content to be displayed together with the photographed picture, on the basis of the identification information on the content; and
    a performance information management unit configured to, in response to identification information on the digital signage being estimated with reference to the photographed picture. derive performance information on the content and performance information on the digital signage on the basis of the identification information on the content and the identification information on the digital signage,
    wherein the identification information on the digital signage is estimated with reference to an identification marker included in the photographed picture, and
    wherein the performance information on the content is derived on the basis of a number of users who view or photograph the content, and the performance information on the digital signage is derived on the basis of a number of users who utilize the digital signage.

8. A method for managing an augmented reality interface related to a content provided by a digital signage, the method comprising the steps of:
    acquiring a picture photographed by a device in relation to a content provided by a digital signage;
    specifying a comparison target content related to the content on the basis of at least one of information on a position of the device and an identification marker related to the content and included in the acquired picture;
    estimating identification information on the content with reference to the specified comparison target content;
    estimating identification information on the digital signage on the basis of at least one of the information on the position of the device, the identification marker related to the content, and the identification information on the content; and
    deriving performance information on the content and performance information on the digital signage on the basis of the identification information on the content and the identification information on the digital signage, wherein the performance information on the content is derived on the basis of a number of users who view or photograph the content, and the performance information on the digital signage is derived on the basis of a number of users who utilize the digital signage.

9. The method of claim 8, wherein in the acquiring step, the photographed picture is acquired at a predetermined interval of frames.

10. The method of claim 8, wherein the identification marker related to the content is included in the acquired picture at a predetermined interval of frames.

11. The method of claim 8, wherein the identification marker related to the content is a visually indistinguishable watermark.

12. The method of claim 8, further comprising the step of:

causing an augmented reality interface corresponding to the content to be displayed together with the photographed picture, with reference to information on a surrounding space of the digital signage acquired on the basis of the identification information on the digital signage.

13. The method of claim 8, wherein in the specifying step, the comparison target content related to the content is specified with reference to associated identification information estimated in relation to an associated content that is provided temporally adjacent to the content by the digital signage.

14. A non-transitory computer-readable recording medium having stored thereon a computer program for executing the method of claim 10.

15. A system for managing an augmented reality interface related to a content provided by a digital signage, the system comprising:

a picture acquisition unit configured to acquire a picture photographed by a device in relation to a content provided by a digital signage;

an augmented reality interface management unit configured to specify a comparison target content related to the content on the basis of at least one of information on a position of the device and an identification marker related to the content and included in the acquired picture, estimate identification information on the content with reference to the specified comparison target content, and estimate identification information on the digital signage on the basis of at least one of the information on the position of the device, the identification marker related to the content, and the identification information on the content; and a performance information management unit configured to derive performance information on the content and performance information on the digital signage on the basis of the identification information on the content and the identification information on the digital signage, wherein the performance information on the content is derived on the basis of a number of users who view or photograph the content, and the performance information on the digital signage is derived on the basis of a number of users who utilize the digital signage.

* * * * *